United States Patent
Tanaka et al.

(10) Patent No.: US 10,185,764 B2
(45) Date of Patent: Jan. 22, 2019

(54) TILED SEARCH RESULTS

(71) Applicants: Yumiko Tanaka, London (GB); William Abbott, San Francisco, CA (US)

(72) Inventors: Yumiko Tanaka, London (GB); William Abbott, San Francisco, CA (US)

(73) Assignee: SONY INTERACTIVE ENTERTAINMENT LLC, San Mateo, CA (US)

(*) Notice: Subject to any disclaimer, the term of this patent is extended or adjusted under 35 U.S.C. 154(b) by 395 days.

(21) Appl. No.: 14/937,654

(22) Filed: Nov. 10, 2015

(65) Prior Publication Data

US 2016/0188683 A1 Jun. 30, 2016

Related U.S. Application Data

(60) Provisional application No. 62/078,281, filed on Nov. 11, 2014.

(51) Int. Cl.
*G06F 17/30* (2006.01)

(52) U.S. Cl.
CPC .. *G06F 17/30696* (2013.01); *G06F 17/30554* (2013.01)

(58) Field of Classification Search
CPC ......... G06F 17/30554; G06F 17/30696; G06T 11/60
See application file for complete search history.

(56) References Cited

U.S. PATENT DOCUMENTS

| | | | | |
|---|---|---|---|---|
| 8,554,756 B2* | 10/2013 | Gemmell | .......... | G06F 17/30867 707/706 |
| 8,606,652 B2 | 12/2013 | Gonsalves et al. | | |
| 8,631,440 B2 | 1/2014 | Gossweiler, III et al. | | |
| 9,736,544 B2* | 8/2017 | Tanaka | ............... | H04N 21/4325 |
| 9,762,948 B2* | 9/2017 | Arriola | ................... | H04N 5/445 |
| 2007/0061197 A1* | 3/2007 | Ramer | .................. | G06Q 30/02 705/14.64 |
| 2011/0145753 A1* | 6/2011 | Prakash | ................ | G06F 3/0481 715/783 |
| 2011/0191328 A1* | 8/2011 | Vernon | ................ | G11B 27/034 707/723 |
| 2014/0075475 A1 | 3/2014 | Sirpal et al. | | |
| 2014/0372419 A1* | 12/2014 | Li | ..................... | G06F 17/30554 707/723 |
| 2015/0199412 A1* | 7/2015 | Chan | ................. | G06F 17/30991 707/722 |

OTHER PUBLICATIONS http://www.locatetv.com/ : 2007.

* cited by examiner

*Primary Examiner* — Merilyn P Nguyen
(74) *Attorney, Agent, or Firm* — Trellis IP Law Group, PC

(57) ABSTRACT

Implementations generally relate to search results. In some implementations, a method includes receiving a search query, where the search query includes a least a portion of a name of a target content item. The method further includes causing a display of search results, where the search results include one or more of a name of one or more candidate content items, and one or more respective icons that are associated with the one or more candidate content items, where at least of the candidate content items matches the target content item. The method further includes causing the search results to be displayed in a tile configuration.

20 Claims, 3 Drawing Sheets

TILED SEARCH RESULTS

CROSS REFERENCES TO RELATED APPLICATIONS

This application claims priority from U.S. Provisional Patent Application Ser. No. 62/078,281, entitled TILED SEARCH RESULTS, filed on Nov. 11, 2014, which is hereby incorporated by reference as if set forth in full in this application for all purposes.

BACKGROUND

Searching the vast amount of content provided by network television stations, cable and satellite channels, and Internet providers can be a daunting task. Conventional search methods are text based where a user is provided with a listing of shows or other content that include a partial or complete match for search criteria. Often times, knowing the title of a particular piece of content will not provide the desired results, as more than one movie or television program may share the same or substantially similar title.

SUMMARY

Implementations generally relate to search results. In some implementations, a method includes receiving a search query, where the search query includes a least a portion of a name of a target content item. The method further includes causing a display of search results, where the search results include one or more of a name of one or more candidate content items, and one or more respective icons that are associated with the one or more candidate content items, where at least one of the candidate content items matches the target content item. The method further includes causing the search results to be displayed in a tile configuration.

A further understanding of the nature and advantages of particular implementations disclosed herein may be realized by reference to the attached figures and remaining portions of the specification.

DETAILED DESCRIPTION OF EMBODIMENTS

Implementations generally relate to search results. The search results may include, for example, media content items such as movies, television shows, audio recordings, etc. In some implementations, a system receives a search query from a user. The search query may include a least a portion of a name of a target content item. The method further includes causing a display of search results, where the search results include one or more of a name of one or more candidate content items, and one or more respective icons that are associated with the one or more candidate content items, where at least one of the candidate content items matches the target content item. The method further includes causing the search results to be displayed in a tile configuration.

As described in more detail herein, a search user interface (UI) is presented where the results of a search query are provided to the user in a tile format. In various implementations, the results of the search query include a particular result, which may include an identifier of one or more content items. In various implementations, the identifier for a given content item may be a name or a title, for example. In various implementations, the results of the search query may also include graphical information corresponding to the content items. In some implementations, the graphical information may include an icon or a thumbnail image associated with each content item.

Implementations described herein may be applied to any content distribution system including, for example, a set top box, a console, a laptop, a tablet, desktop, a mobile device, for example a smartphone or cellular phone, and including an integrated or separate display device, for example a monitor.

The foregoing is merely illustrative of the interface and principles of implementations described herein. Various modifications may be made by those of ordinary skill in the art without departing from the scope and spirit of the implementations described herein.

Figure 1:
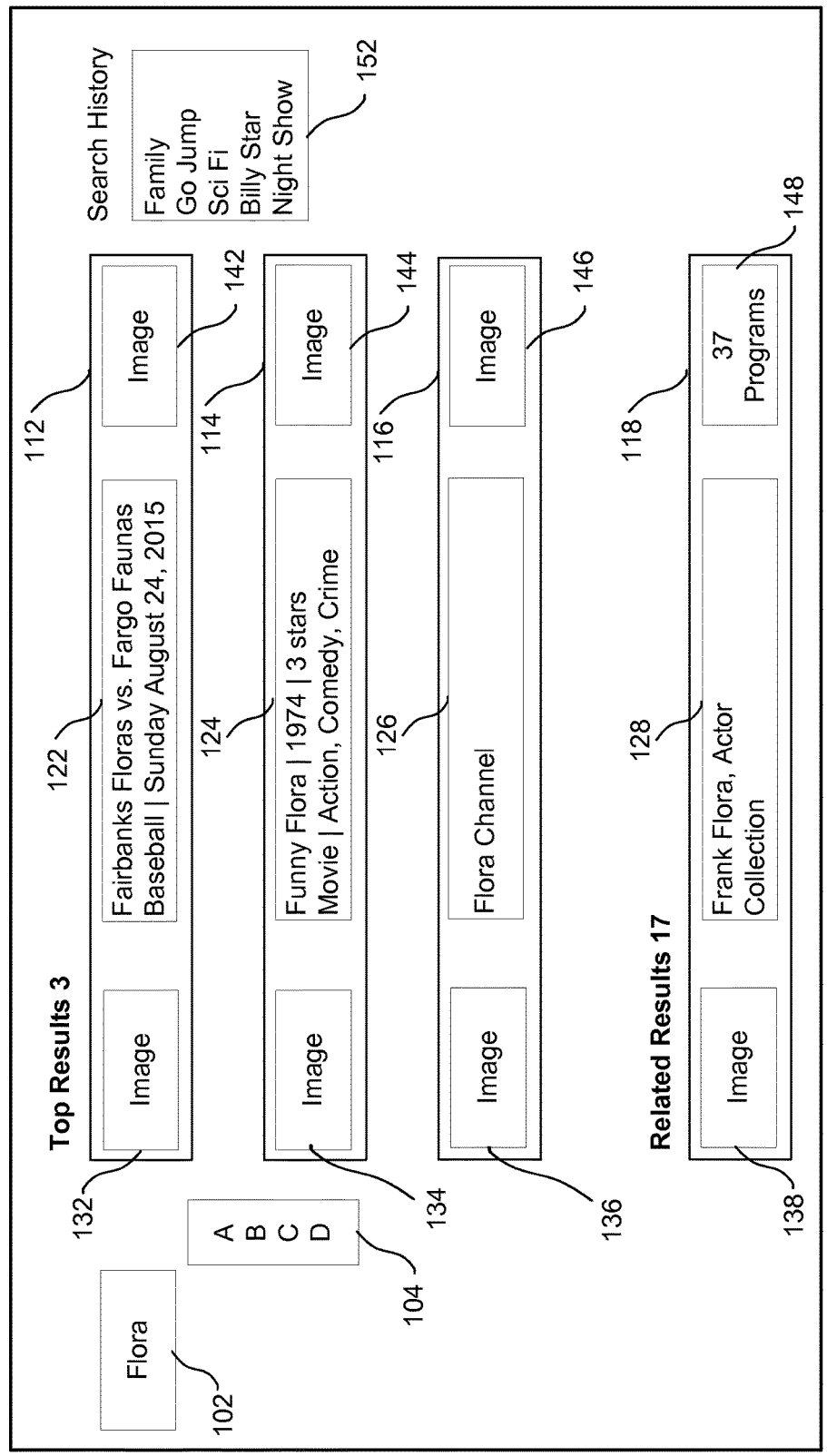
FIG. 1 illustrates a user interface that includes a search view, according to some implementations.

FIG. 1 illustrates a user interface that includes a search view 100, according to some implementations. In various implementations, the user interface that includes a search view 100 fills a display screen and is presented as an overlay in the foreground across a currently playing piece of content in the background. In some implementations, search view 100 may replace a previous screen and comprise the entire display.

In various implementations, search view 100 is a tiled search view, as shown, where elements in the search view are arranged into tiles. As shown, search view 100 includes a search field 102, a scroll list 104, search results 112, 114, 116, and 118, textual information 122, 124, 126, and 128, graphical information 132, 134, 136, and 138, source information 142, 144, 146, and 148, and a search history 152.

In some implementations, search view 100 may include a label over the top-most search results (e.g., "Top Results," etc.) and a number of such search results (e.g., "1," "2," "3," "4," "5," etc.) to indicate the most popular and relevant search results. The actual number of such search results may vary, and will depend on the particular implementation and the particular search. The particular technique for determining the most popular and relevant search results may vary, and will depend on the particular implementation.

As shown, in this particular example, search results 112, 114, and 116 are shown as the most popular and relevant search results (e.g., under the "Top results" header). The header also shows that there are 3 top results. In various implementations, this list is a dynamic and regenerative list that populates as the user enters more letters.

In some implementations, search view 100 may also include a label over the next set of search results (e.g., "Related Results," "Remaining Results," etc.) and a number of such search results (e.g., "5," "10," "50," "100," "200," etc.) to indicate related search results, and/or to indicate the remaining search results. The actual number of such search results may vary, and will depend on the particular implementation and the particular search. In some implementations, the relevant and/or remaining search results may be presented in the order of most popular to least popular, or most relevant to least relevant. The particular technique for determining the related and/or remaining search results may vary, and will depend on the particular implementation.

As shown, in this particular example, search results including search result 118 are shown as the related search results (e.g., under the "Related Results" header). The header also shows that there are 17 related results. In various implementations, this list is a dynamic and regenerative list that populates as the user enters more letters.

In various implementations, search view 100 may have a tumbler configuration for use in presenting scroll list 104 and for displaying results of a user search query. Search view 100 may also include a search history 152. Operations of search view 100 are described in more detail below in connection with FIG. 3.

Figure 2:
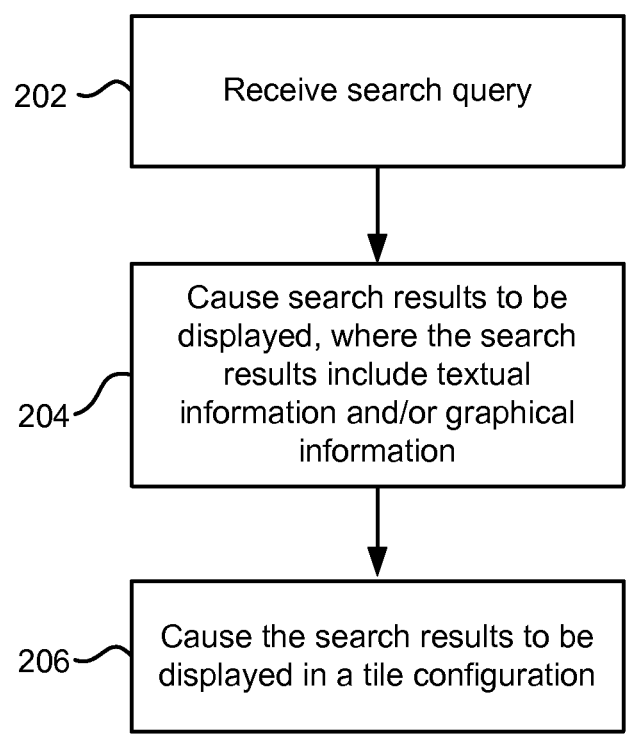
FIG. 2 illustrates an example flow diagram for providing search results, according to some implementations

FIG. 2 illustrates an example flow diagram for providing search results, according to some implementations. In various implementations, content to be search may include television programs, movies, games, books, magazines, music or other searchable content items. As described in more detail below, the system may provide search results of textual information and graphical information associated with content items.

Referring to both FIGS. 1 and 2, a method is initiated in block 202, where the system receives a search query from a user. In various implementations, the user may enter search words in search field 102. In various implementations, the search query may include a name or title of a content item. As indicated above, the content item may be, for example, a media content item such as a movie, television, audio recording, etc., and each content item may be associated with a name and well as with other information (e.g., source, category, etc.). In the example shown in FIG. 1, "Flora" is the search term used for the search query. In some implementations, if the user inputs search string that becomes long, latter portions of the search string may jump to a second line.

In various implementations, the search query may include at least a portion of a name of a target content item. For example, the user might not know the exact name of a desired content item, or might know only a few words of the entire name, or might mistype a portion of the name. As such, the system may still perform the search with limited information. In some implementations, the system may automatically include search terms that substantially match any word or string that the user enters in the search query field. In some scenarios, the search query may include the entire/complete name of the desired content item.

In some implementations, the system enables the user to enter a search query using scroll list 104, which is a rotating list. Scroll list 104 may include a series of alphanumeric characters. For example, the alphanumeric characters may include the western alphabet and number system along with a space. The specific alphabet and number system may vary, and will depend on the particular implementation. The user selects one or more characters to spell out the search parameters (e.g., title, name, etc.) of the content that the user is looking for. In some implementations, as the user types more letters and gets closer to a specific result fewer letters will appear. This facilitates the user in finding the desired title, name, etc. In this particular example, the user has selected a series of alphanumeric characters (e.g., "Flora") from scroll list 104, rather than having to navigate a static keyboard. In some implementations, the system may enable the user to enter a search query using a keyboard.

In block 204, the system causes the search results to be displayed on the display screen. As shown, search results 112, 114, 116, and 118 are displayed or presented as a series of tiles containing various types of information resulting from the search query. As described in more detail below, in various implementations, the search results include one or more of textual information 122, 124, 126, and 128 and/or graphical information 132, 134, 136, and 138. In various implementations, search results 112, 114, 116, and 118 may include titles, channels, and/or actor name matches. In various implementations, such information may be in the form of text and/or graphics (e.g., images, icons, etc.), thereby providing a more visually interesting display with search results that are easier to recognize.

In various implementations, the textual information is associated with one or more candidate content items. In various implementations, the textual information includes one or more names (e.g., title or other identifier, etc.) that are associated with each of the one or more candidate content items. For example, as shown in FIG. 1, example textual information includes the following titles, "Fairbanks Floras vs. Fargo Faunas," "Funny Flora," "Flora Channel," and "Frank Flora." The particular titles may vary, and will depend on the particular implementation. Also, the number of search results may vary, and will depend on the particular implementation. In some implementations, if there are more tiles from the search results than can fit on the display screen, the system may enable the user to scroll down to view all of the search results. As shown, the content item titles fall into various content categories (e.g., sports, movies, channels, actors, etc.).

In various implementations, the graphical information is associated with the one or more candidate content items. In various implementations, the graphical information comprises one or more images that are associated with the one or more candidate content items. The images may include thumbnail images, logos, etc. For example, images 132, 134, 136, and 138 correspond with titles 122, 124, 126, and 128, wherein image 132 may be an image of icons representing the Fairbanks Floras and the Fargo Faunas, image 134 may be an icon representing Funny Flora, image 136 may be an icon representing the Flora Channel, and image 138 may be a thumbnail image of Frank Flora. The particular graphical information may vary, and will depend on the particular implementation.

As shown, source information 142, 144, and 146 include icons corresponding to the content provider associated with search results 112, 114, and 116; and source information 148 includes information indicating the number of programs associated with search result 118. The programs may include various projects that the actor has been involved in such as television shows, movies, etc.

In various implementations, at least one of the candidate content items matches the target content item. As shown, there are several pieces of content that include the term Flora. In this particular example, the user was searching for the actor Frank Flora. As shown, the tile box for Frank Flora includes an image 138 (e.g., image of the actor), his name, and a brief description of the contents of the tile.

In various implementations, the content to be searched may be maintained on a local device or on a server remote from the device of a user (e.g., client device). The content being searched may be provided to the client device either by download or streaming methodologies.

In block 206, the system causes the search results to be displayed in a tile configuration. In this manner, the tiles provide the user with both textual information and graphical information, which increases the ability of the user to select the content being searched for. The combination of textual information and graphical information provides a differentiator between two or more content items that have the same or a substantially similar name.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

In some implementations, where the graphical information includes content provider information such as a content provider identifier, the system may cause content provider information (e.g., a content provider icon, etc.) to animate. Animating the provider identifier provides a visually engaging experience when using the search tool, thereby enhancing the user viewing experience. For example, when the particular piece of content is being provided by more than one content provider, and when a particular tile is selected, the system may cause the icon to become animated to show each of the providers that are, or that will be airing, the particular content item. For example, the system may cause the icon to spin in either a clockwise direction or a counter-clockwise direction, thereby showing each of the content providers presenting a particular piece of content. In some implementations, when the user selects a particular animated tile, the system may provide a separate screen in order to show the user airing dates and times for the selected item.

In various implementations, when the user selects the tile box when a particular content provider icon is displayed, the user (e.g., client device of the user) is tuned to the station airing the actual content item (e.g., movie, etc.) if the content item is available (e.g., the movie is currently playing). In some implementations, if a particular content item is not currently available (e.g., the movie is not currently playing) when the user selects the tile box, the system may display a detailed page corresponding to the particular content provider channel to inform the user of when the selected movie will be played.

In some implementations, when the user selects a particular tile, the system may cause a synopsis box (not shown) to be displayed (e.g., on the bottom portion of the tile), where the synopsis window provides the user with additional information about the content associated with the particular tile. For example, the synopsis window may include a description of an episode of a series, a description of the plot of a movie, contestants competing in a selected sporting event, etc.

In some implementations, only the top portion of a tile of each search result is presented on the initial results page. When the user highlights or otherwise selects a particular tile, a synopsis box may be in the form of a drawer, which corresponds to the button portion of the tile box. If the user accesses the bottom portion of the tile box, the tile box will expand along the bottom portion thereof where more detailed information is displayed. For example, a synopsis of the particular show or description of the movie and other characters present therein, about the selected piece of content will be presented to the user. In various implementations, the synopsis box may include graphical information corresponding to the search result, which makes it easier for the user to review and distinguish one piece of content from another. As such, the overall search process is easier and more enjoyable for the user.

Referring still to FIG. 1, as indicated above, in various implementations, the system causes a search history 152 to be displayed, where search view 100 includes search history 152. In various implementations, search history 152 maintains a predetermined number of previous searches conducted by the user, and search history 152 displays the previous searches for quick reference and repeat searches. The predetermined number of previous searches may vary, and will depend on the particular implementations.

In some implementations, the most recent search (e.g., "Family") is presented at the top of the list. In some implementations, following the most recent search, the successive previous searches are presented in descending order.

In various implementations, search history 152 provides the benefit of allowing the user to repeat a previous search at a different (e.g., later) time. This enables the user to get updated information about programming being played on a particular channel or updated information about a prior search in order to discover new and potentially interesting programming to watch.

In some implementations, entered text in the search does not automatically go into search history 152. To go into search history 152, the user enters the search query. When the user selects one of the saved searches in search history 152, the results portion of the page displays the tiles of the previously conducted search. This makes reviewing prior searches easier in that the search query does not have to be re-entered. The search and corresponding results are immediately available and presented to the user, which improves the overall search experience of the user.

In various implementations, search history 152 enables the user to modify previous searches without having to completely re-enter the search criteria.

Implementations described herein provide various benefits. For example, implementations provide a pleasant searching experience for the user. Implementations described herein also increase overall engagement among users.

Figure 3:
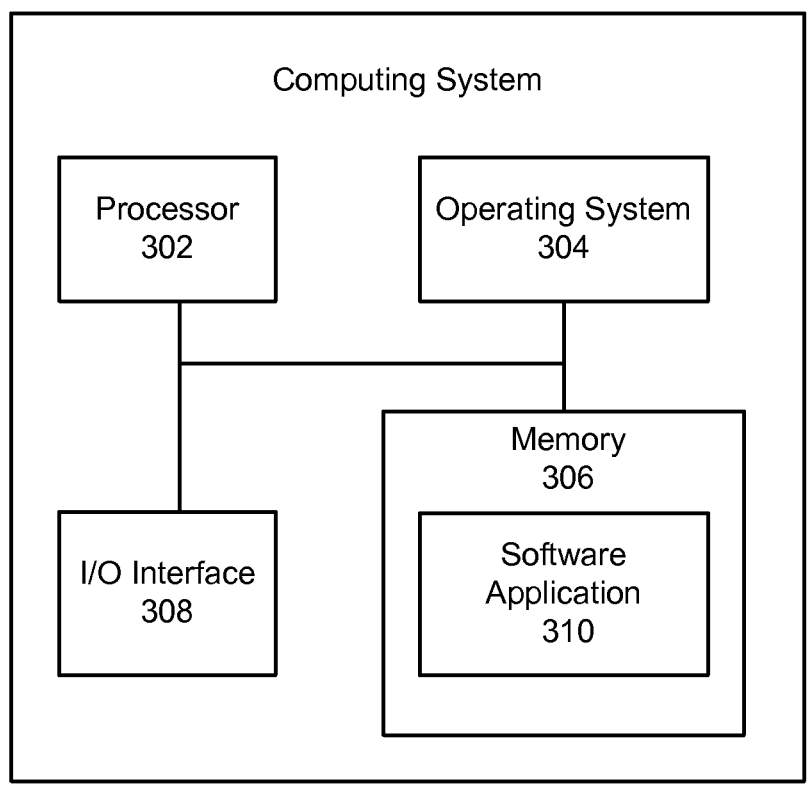
FIG. 3 illustrates a block diagram of an example system, which may be used for implementations described herein.

FIG. 3 illustrates a block diagram of an example computing system 300, which may be used for implementations described herein. In some implementations, computing system 300 may include a processor 302, an operating system 304, a memory 306, and an input/output (I/O) interface 308. In various implementations, processor 302 may be used to implement various functions and features described herein, as well as to perform the method implementations described herein. While processor 302 is described as performing implementations described herein, any suitable component or combination of components of computing system 300 or any suitable processor or processors associated with computing system 300 or any suitable system may perform the steps described. Implementations described herein may be carried out on a user device, on a server, or a combination of both.

Computing system 300 also includes a software application 310, which may be stored on memory 306 or on any other suitable storage location or computer-readable medium. Software application 310 provides instructions that enable processor 302 to perform the functions described herein and other functions. The components of computing system 300 may be implemented by one or more processors or any combination of hardware devices, as well as any combination of hardware, software, firmware, etc.

For ease of illustration, FIG. 3 shows one block for each of processor 302, operating system 304, memory 306, I/O interface 308, and software application 310. These blocks 302, 304, 306, 308, and 310 may represent multiple processors, operating systems, memories, I/O interfaces, and software applications. In various implementations, computing system 300 may not have all of the components shown and/or may have other elements including other types of components instead of, or in addition to, those shown herein.

Although the description has been described with respect to particular embodiments thereof, these particular embodiments are merely illustrative, and not restrictive.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments. For example, a tangible medium such as a hardware storage device can be used to store the control logic, which can include executable instructions.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A computer-implemented method for providing search results, the method comprising:

receiving a search query, wherein the search query includes at least a portion of a name of a target content item;

causing the search results to be displayed on a display screen, wherein the search results include one or more of textual information and graphical information, wherein the textual information is associated with one or more candidate content items, wherein the one or more candidate content items are program content items, wherein the textual information includes titles of the one or more candidate content items, wherein the graphical information is associated with the titles and the one or more candidate content items, and wherein at least one of the candidate content items matches the target content item; and causing the search results to be displayed in a tile configuration.

2. The method of claim 1, wherein the textual information comprises one or more names that are associated with each of the one or more candidate content items.

3. The method of claim 1, wherein the graphical information comprises one or more images that are associated with the one or more candidate content items.

4. The method of claim 1, further comprising causing content provider information to animate.

5. The method of claim 1, further comprising causing a synopsis box to be displayed.

6. The method of claim 1, further comprising causing a synopsis box to be displayed, wherein the synopsis box is in the form of a drawer.

7. The method of claim 1, further comprising causing a search history to be displayed.

8. A non-transitory computer-readable storage medium with program instructions stored thereon, the program instructions when executed by one or more processors are operable to perform operations comprising:

receiving a search query, wherein the search query includes at least a portion of a name of a target content item;

causing the search results to be displayed on a display screen, wherein the search results include one or more of textual information and graphical information, wherein the textual information is associated with one or more candidate content items, wherein the one or more candidate content items are program content items, wherein the textual information includes titles of the one or more candidate content items, wherein the graphical information is associated with the titles and the one or more candidate content items, and wherein at least one of the candidate content items matches the target content item; and causing the search results to be displayed in a tile configuration.

9. The computer-readable storage medium of claim 8, wherein the textual information comprises one or more names that are associated with each of the one or more candidate content items.

10. The computer-readable storage medium of claim 8, wherein the graphical information comprises one or more images that are associated with the one or more candidate content items.

11. The computer-readable storage medium of claim 8, wherein the software when executed is further operable to perform operations comprising causing content provider information to animate.

12. The computer-readable storage medium of claim 8, wherein the software when executed is further operable to perform operations comprising causing a synopsis box to be displayed.

13. The computer-readable storage medium of claim 8, wherein the software when executed is further operable to perform operations comprising causing a synopsis box to be displayed, wherein the synopsis box is in the form of a drawer.

14. The computer-readable storage medium of claim 8, wherein the software when executed is further operable to perform operations comprising causing a search history to be displayed.

15. A system comprising:
one or more processors; and
logic encoded in one or more non-transitory computer-readable media for execution by the one or more processors, and when executed operable to perform operations comprising:
receiving a search query, wherein the search query includes at least a portion of a name of a target content item;
causing the search results to be displayed on a display screen, wherein the search results include one or more of textual information and graphical information, wherein the textual information is associated with one or more candidate content items, wherein the one or more candidate content items are program content items, wherein the textual information includes titles of the one or more candidate content items, wherein the graphical information is associated with the titles and the one or more candidate content items, and wherein at least one of the candidate content items matches the target content item; and
causing the search results to be displayed in a tile configuration.

16. The system of claim 15, wherein the textual information comprises one or more names that are associated with each of the one or more candidate content items.

17. The system of claim 15, wherein the graphical information comprises one or more images that are associated with the one or more candidate content items.

18. The system of claim 15, wherein the logic when executed is further operable to perform operations comprising causing content provider information to animate.

19. The system of claim 15, wherein the logic when executed is further operable to perform operations comprising causing a synopsis box to be displayed.

20. The system of claim 15, wherein the logic when executed is further operable to perform operations comprising causing a synopsis box to be displayed, wherein the synopsis box is in the form of a drawer.

* * * * *